No. 811,914. PATENTED FEB. 6, 1906.
G. F. GILLENWATERS.
POULTRY FOUNTAIN.
APPLICATION FILED SEPT. 2, 1905.

WITNESSES:
T. Castberg
B. Howse

INVENTOR.
Grant F. Gillenwaters
BY Geo. H. Strong.
ATTORNEY

UNITED STATES PATENT OFFICE.

GRANT F. GILLENWATERS, OF EAST SACRAMENTO, CALIFORNIA.

POULTRY-FOUNTAIN.

No. 811,914.      Specification of Letters Patent.      Patented Feb. 6, 1906.

Application filed September 2, 1905. Serial No. 276,854.

*To all whom it may concern:*

Be it known that I, GRANT FRANKLIN GILLENWATERS, a citizen of the United States, residing at East Sacramento, in the county of Sacramento and State of California, have invented new and useful Improvements in Poultry-Fountains, of which the following is a specification.

My invention relates to drinking-fountains for fowls and stock.

The special object of the invention is to provide a cheap, simple, and practical device for watering chickens, which device will permit of a constant stream of running water to pass through it, which will admit easily of the mixture of a suitable disinfectant with the drinking-water, which may be easily kept clean, and which will have no possibility of slopping over to wet the floors of the houses, coops, or compartments in which the chickens are kept, since it is essential to the health of the fowls that they be kept as dry as possible.

The invention consists of the parts and the construction and the combination of parts, as hereinafter more fully described and claimed, having reference to the accompanying drawings, in which—

Figure 1:
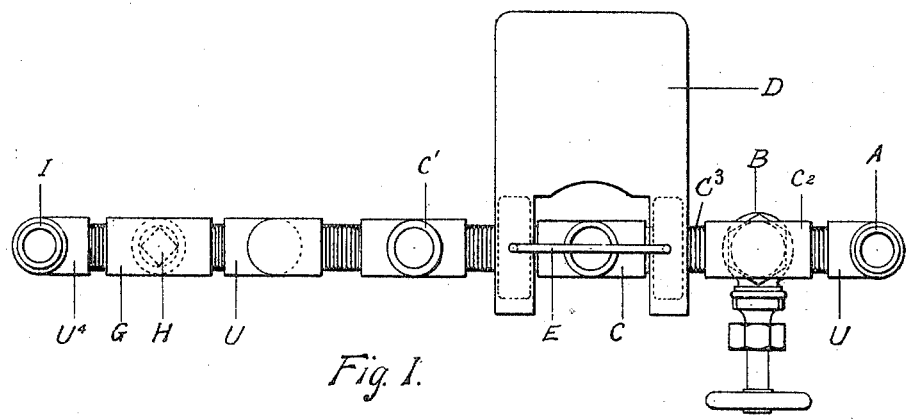
Figure 2:
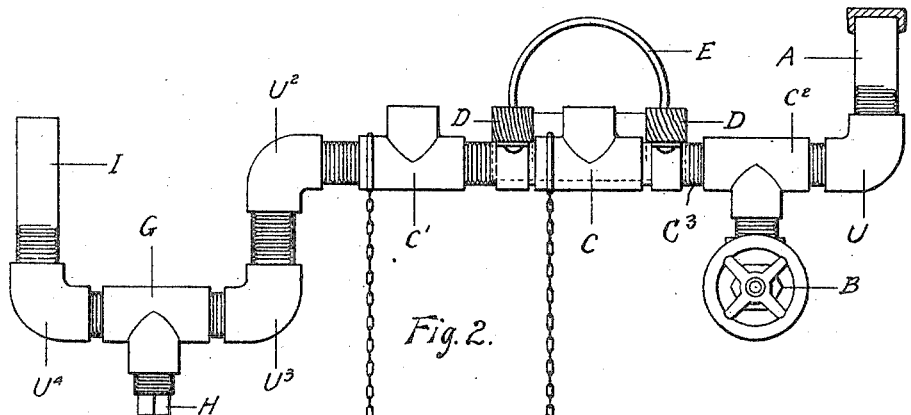
Figures 3, 4, 5:
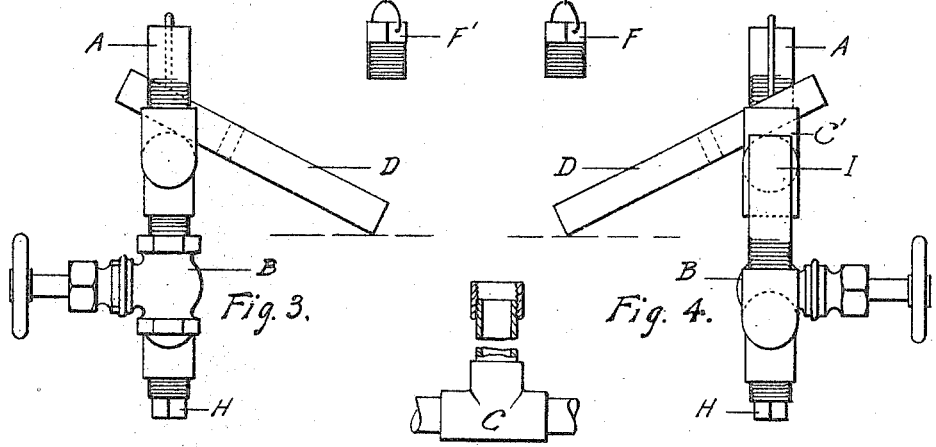

Figure 1 is a plan view of my improved fountain. Fig. 2 is a side elevation of the same. Fig. 3 is a front end view. Fig. 4 is a rear end view of the device. Fig. 5 represents a modification of the invention.

In carrying out the invention I take a number of common pipe-fittings, elbows, nipples, T's, and pipe-sections and connect them together in a form shown in Figs. 1 and 2. The device is generally set about a foot from the ground, and connection is made with the main or any suitable source of water-supply under pressure through suitable connections controlled by the gate B. From the main the water enters a T $C^2$, flows through a nipple or pipe-section $C^3$ into T C, which has its central arm upturned and generally open to the atmosphere and forming a drinking-cup. In practice this T has an orifice about one inch in diameter. From this drinking unit C extends another pipe-section or nipple connecting with another T C', and there may be as many T's C C', &c., as there are drinking cups or fountains desired. Outside the coop or hen-house is a drop portion in the water-conduit formed by the elbows $U^2$ $U^3$ $U^4$ T G, and upraise I. Ordinarily the T G is closed by a plug H, and the upper end of the upraise I is a little below the upper open ends of the drinking-cups C C'. By having the open end of the upraise I a little below the open part of the drinking-cups C C' the water-level is maintained at such a height that there can be no overflow within the coops, although it permits cock B to remain constantly open to allow a continual flow of fresh sweet water through the device. The T $C^2$ connects with the elbow U and an upraise A to allow the infeed of a suitable disinfectant, either in liquid or solid form, to be mixed with the water.

D represents a suitable incline leading up from the ground, on which the chickens may travel when they want to get a drink. The fowls are prevented from perching over a cup by means of the bail or wicket E.

When it is desired to flush out the apparatus, plugs F and F' are inserted into C C' and the plug H removed and the force of water turned on, which quickly cleanses the apparatus.

If it were desired to set the principal portion of the apparatus into the ground and leave only the drinking-cups, the infeed A, and the outlet I exposed, it would only be necessary to prolong the sections A and I and to screw a vertical section of pipe into each T C C', &c., as shown in Fig. 5. If desired, a union could be screwed onto the top of each vertical pipe-section to form a drinking-cup for the fowls. Any size, length, and number of pipe-sections and fittings may be employed.

Having thus described my invention, what I claim, and desire to secure by Letters Patent, is—

1. A drinking-fountain comprising a conduit provided with an inlet and outlet, a drinking-cup normally open to the atmosphere and connected with the conduit and interposed between said inlet and outlet, said outlet arranged slightly below the level of the top of the cup whereby flow may take place through the conduit without overflowing the cup, said cup arranged at an elevation above the ground, an incline leading up to said cup, and a wicket partly inclosing the cup.

2. A drinking-fountain comprising a conduit formed of a series of conjoined pipe-sections and pipe connections, said conduit having upturned ends arranged at different levels and provided with an inlet intermediate of its ends, drinking-cups comprising T's interposed in the conduit with central branches pointed upward and normally open to the atmosphere, the outlet end of said conduit arranged at a slightly lower level than the top of said upturned branches.

3. A drinking-fountain comprising a conduit composed of a series of conjoined pipe sections and connections, said conduit having an inlet, and having a drop U-shaped portion adjacent to its discharge end, a drain-plug in the bend of said U, drinking-cups between said U and the inlet, and the upper end of the outer arm of the U arranged at a lower level than the top of said cups.

In testimony whereof I have hereunto set my hand in presence of two subscribing witnesses.

GRANT F. GILLENWATERS.

Witnesses:
 A. C. HINKSON,
 M. S. WAHRHAFTIG.